United States Patent
Bluecher et al.

(10) Patent No.: US 11,390,778 B2
(45) Date of Patent: Jul. 19, 2022

(54) PATTERNED SURFACES WITH SUCTION

(71) Applicant: BVW Holding AG, Cham (CH)

(72) Inventors: Lukas Bluecher, Eurasberg (DE); Michael Milbocker, Holliston, MA (US)

(73) Assignee: BVW Holding AG, Cham (CH)

( * ) Notice: Subject to any disclaimer, the term of this patent is extended or adjusted under 35 U.S.C. 154(b) by 222 days.

(21) Appl. No.: 16/524,367

(22) Filed: Jul. 29, 2019

(65) Prior Publication Data

US 2020/0032112 A1  Jan. 30, 2020

Related U.S. Application Data

(60) Provisional application No. 62/711,545, filed on Jul. 29, 2018.

(51) Int. Cl.
| | |
|---|---|
| C09J 9/00 | (2006.01) |
| B32B 3/26 | (2006.01) |
| B32B 3/30 | (2006.01) |
| C09J 7/38 | (2018.01) |
| C09J 7/20 | (2018.01) |

(52) U.S. Cl.
CPC .. *C09J 7/38* (2018.01); *C09J 7/20* (2018.01)

(58) Field of Classification Search
CPC ...... C09J 7/38; C09J 9/00; B32B 3/26; B32B 3/30; B32B 2405/00
See application file for complete search history.

(56) References Cited

U.S. PATENT DOCUMENTS

| | | | |
|---|---|---|---|
| 6,297,060 B1 | 10/2001 | Nowakowski et al. | |
| 7,578,954 B2 * | 8/2009 | Gartstein | A61M 37/0015 264/154 |
| 7,645,383 B2 | 1/2010 | Kadel et al. | |
| 7,976,762 B2 | 7/2011 | Stutzmann et al. | |
| 8,586,132 B2 | 11/2013 | Thallner | |
| 8,877,498 B2 | 11/2014 | Wegst et al. | |
| 9,065,675 B2 | 6/2015 | Seth et al. | |
| 9,120,670 B2 | 9/2015 | Hulseman et al. | |
| 9,238,309 B2 | 1/2016 | King et al. | |

(Continued)

FOREIGN PATENT DOCUMENTS

| | | |
|---|---|---|
| CN | 104321034 A | 1/2015 |
| CN | 108290731 A | 7/2018 |

(Continued)

OTHER PUBLICATIONS

International Search Report for corresponding patent application PCT/US2019/043879, dated Feb. 3, 2020, 7 pages.

*Primary Examiner* — Joanna Pleszczynska
(74) *Attorney, Agent, or Firm* — Patterson Intellectual Property Law, P.C.; Ryan D. Levy; Mark A. Kilgore

(57) ABSTRACT

A microstructured pressure-sensitive surface is described comprising a Wenzel-Cassie hydrophilic-hydrophobic zone structure and capillary action with improved peel strength. The capillary action is enhanced by the Wenzel-Cassie zone creation, and the barrier energy to disruption of the Wenzel-Cassie zone is increased by the capillary action. The microstructured surfaces of the present invention create water zones of exclusion, where entropic effects reinforce Wenzel-Cassie zone stability, creating a suction effect that conforms the microstructure surface to a target surface.

16 Claims, 8 Drawing Sheets

(56) References Cited

U.S. PATENT DOCUMENTS

| | | |
|---|---|---|
| 9,908,274 B2 | 3/2018 | Hulseman et al. |
| 9,988,201 B2 | 6/2018 | Darin et al. |
| 10,022,227 B2 | 7/2018 | Jennissen |
| 10,024,866 B2 | 7/2018 | Studer et al. |
| 10,160,145 B2 | 12/2018 | Reiter |
| 10,377,044 B2 | 8/2019 | Hulseman et al. |
| 10,458,053 B2 | 10/2019 | Hulseman et al. |
| 10,575,667 B2 | 3/2020 | Hulseman et al. |
| 10,687,642 B2 | 6/2020 | Hulseman et al. |
| 10,889,005 B2 | 1/2021 | Hulseman et al. |
| 2005/0148984 A1 | 7/2005 | Lindsay et al. |
| 2005/0227031 A1* | 10/2005 | Yang ................ B32B 17/10577 428/40.1 |
| 2010/0028604 A1 | 2/2010 | Bhushan et al. |
| 2015/0368838 A1 | 12/2015 | Hulseman et al. |
| 2017/0014111 A1 | 1/2017 | Hulseman et al. |
| 2017/0095242 A1 | 4/2017 | Milbocker et al. |
| 2017/0348065 A1* | 12/2017 | Bluecher ................ A41D 31/12 |
| 2019/0062155 A1 | 2/2019 | Hulseman et al. |
| 2020/0338808 A1 | 10/2020 | Hulseman et al. |
| 2021/0086371 A1 | 3/2021 | Hulseman et al. |

FOREIGN PATENT DOCUMENTS

| | | |
|---|---|---|
| TW | 200914570 A | 4/2009 |
| WO | 2008102621 A1 | 8/2008 |
| WO | 2013110051 A1 | 7/2013 |

\* cited by examiner

PATTERNED SURFACES WITH SUCTION

CROSS-REFERENCES TO RELATED APPLICATIONS

This application claims benefit of the following patent application(s) which is/are hereby incorporated by reference: U.S. Provisional Application No. 62/711,545 filed on Jul. 29, 2018.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to a microstructured adhesive pressure-sensitive surface.

More particularly, this invention pertains to a microstructured adhesive pressure-sensitive surface having a hierarchical structure comprising a Wenzel-Cassie and Cassie-Baxter hydrophilic-hydrophobic zone structure and capillary action with improved shear and peel characteristics Repositionable pressure-sensitive adhesive surfaces are surfaces which predictably adhere to, yet remain repeatedly peelable from, a variety of target substrates over a long period of time without damaging or marring the substrate. These adhesive devices may have many commercial uses. For example, labels, protective films, and medical surfaces all may be used to quickly adhere to metal, paper, plastics, and/or skin, but must also peel smoothly away from these varied target substrates without leaving behind any adhesive residue or causing harm or damage to the surface of the particular target substrate.

Fundamentally, an understanding of the adhesive effects associated with suctional hierarchical microstructures is to understand how solutes interact with hydrophobic and hydrophilic surfaces. Within such aqueous zones, solutes can sense surface features. Sensing interactions are generally thought to fall off within nanometers of the surface, although in colloidal and biological systems studied in confined spaces, size-dependent depletion effects may extend by up to several particle diameters.

The realization of artificial hydrophobic/hydrophilic surfaces relies on two main features: the surface material chemical composition and its morphological structure. Usually, the chemical composition is an intrinsic property of materials. On the other hand, micro- and nano-morphology may enhance hydrophobicity/hydrophilicity, especially by exploiting hierarchical and fractal architectures, allowing air pocket formation to create three phase domain zones (liquid/gas/solid).

Hydrophilic-hydrophobic interfaces, such as those developed in the Wenzel-Cassie interface state, play a more profound role than generally assumed. Solutes in aqueous suspension are extensively excluded from the vicinity of many interfaces, and such exclusion arises from long-range restriction of water molecules, nucleating at the interface of a macrostructure surface and projecting well into the aqueous phase, similar to what occurs in liquid crystals. The presence of such unexpectedly large zones of mobility-limited water may impact many features of surface and interfacial chemistry.

Surface porosity, in addition to hydrophobic and hydrophilic microstructures, may play an important role in developing exclusion zones that are robust against thermal and mechanical disruption. In particular, surface porosity is important in developing high energetic barriers to peel disassociation of an interface between a microstructured surface and a target surface mediated by a liquid. Here, capillary action is introduced as an additional control aspect, having a temporal component and a reinforcing component regarding shear translations and peel force.

What is needed, then, is a uniformly coated, unfilled, microstructured pressure-sensitive adhesive article which exhibits initial repositionability when adhered to a variety of target substrates. Through the independent variation and selection of microstructured patterns and considering the chemical nature of the material comprising the microstructured pressure-sensitive article, the applicants have demonstrated constant or increased long-term adhesion as required by many applications.

BRIEF SUMMARY OF THE INVENTION

The present invention relates to an article, including adhesive surfaces and transfer coatings, bearing a continuous pressure-sensitive adhesive layer having a microstructured surface wherein the microstructured surface may comprise at least two kinds of features and wherein the lateral aspect ratio of the features may range from about 0.1 to about 10 for each feature, and at least one feature dimension difference may be of at least a factor of 3. In one embodiment, two sets of pillars, one 5 microns in diameter and 30 microns tall and another set of pillars 15 microns or greater in diameter and 75 microns tall, may be configured such that the first set of pillars is disposed on the top surface of the second set of pillars (i.e., hierarchical). At least two of the feature dimensions (height, width and length) may be microscopic. In some embodiments, all three of the feature dimensions (height, width, length) may be microscopic.

The microstructured patterned adhesive may exhibit initial repositionability when adhered to a variety of target substrates through the independent variation and selection of microstructured pattern and selection of the chemical nature of the microstructured substrate. The microstructured pattern may display reduced, constant, or increased long-term adhesion as required by the intended application.

In order to satisfy the above needs, understanding the variation of the contact angle formed between a microstructure surface and a water droplet as the surface texture varies may be useful. The conventional understanding is based on chemically homogeneous smooth solid surfaces. Variables such as surface tension of the solid-vapor, solid-liquid, and liquid-vapor interfaces may be important. For a rough hierarchical surface air or liquid may remain trapped in the surface asperities. Therefore, a fraction of the sample solid surface may be directly in contact with the droplet total area, while the other fraction may first contact an air or liquid layer underneath the droplet. How the interface structure develops may depend on the spatial size and distribution of hydrophobic and hydrophilic regions leading respectively to an air pocket and the precursor liquid film formation between hydrophilic and hydrophobic zones. Wenzel and Cassie-Baxter models may need to be considered together to completely describe the wettability of a microstructured hierarchical surface.

The different microstructure dimensions may not have as much effect on the apparent contact angle as the texture depth. That is, when the microstructures are arranged hierarchically, on top of one another, the distance from the top structure to the base substrate may be an important determinant of contact angle at discrete positions on the microstructured surface. On the other hand, the water fractions may follow the same trend in contact angle variation as a surface in which the various microstructure were placed side by side, and not hierarchically. Therefore, the change in apparent contact angle with the texture depth may be strongly dependent on the water fraction. This observation suggests an interpretation of this behavior in terms of capillary phenomena. Indeed, the adhesive effect of the surface may be dramatically enhanced by adding structures with hollow members, or by placing perforations in the substrate.

The phenomenon known as capillary rise may be influenced by porosity, and in particular the distribution of the pores. It is known that over certain length scales, pore surface and volume of most porous media are fractal. Capillary rise may be maximized when the root mean square of the pore diameter is between 0.25 and 0.7 of the capillary density. This is called the fractal dimension. The formation of Wenzel-Cassie domains may also by maximized in this domain. Too many capillaries and the Wenzel-Cassie domains may be disrupted, and too few and the peel force may diminish rapidly. The exact fractal porosity density to use may depend on the texture depth, since in some sense the porosity and depth may accomplish the same function. It should be noted, open pores may maximize peel force for fractal dimensions on the lower end of the 0.25-0.70 range.

In one embodiment of the present invention, a microstructured adhesive pressure-sensitive surface comprised of at least two microstructured patterns of different dimensions arranged hierarchically wherein at least one of the microstructured patterns may be suctional or the hierarchical combinations creates a suctional aspect. A suctional aspect may be a negative feature that draws fluid away from the target surface when the microstructure adhesive surface is brought in contact with a surface comprising a fluid layer.

In one embodiment of the present invention, a microstructured adhesive pressure-sensitive surface may be comprised of three microstructured patterns of different dimensions arranged hierarchically wherein at least one of the microstructured patterns may be suctional or the hierarchical combinations creates a suctional aspect.

In one embodiment, a substrate layer may comprise a two-dimensional pattern which is embossed in such a way that both sides of the substrate layer exhibit a sinusoidal aspect. Furthermore, on top of the sinusoidal substrate layer may comprise embossed solid cylinders filling each complete square cycle of the sinusoidal pattern with between 10 and 100 equally spaced cylinders. Embossed on top of each cylinder in the first pattern of cylinders may be 1 to 10 solid cylinders of a smaller dimension. The capillary effect may be initiated by placing the microstructure surface on the fluid layer of the target surface, and applying a slight pressure to deform the sinusoidal pattern into a flatter conformation, such that when the pressure is removed the sinusoidal aspect may return to its prior sinusoidal shape. This action may generate a suctional force in combination with a capillary force generated by the close placement of the pillars.

In one embodiment, the adhesive device may comprise a flat substrate layer. On top of the flat substrate layer is embossed solid cylinders in a uniformly space square array. Embossed on top of each cylinder in the first pattern of cylinders may be 1 to 10 solid cylinders of a smaller dimension. The interstitial areas between the first layer of pillars may comprise drilled cylindrical holes, which may be drilled completely, or partially, through the substrate layer. The fractal dimension of the drill holes may be in the range of 0.25 to 0.70. The capillary effect may be initiated by placing the microstructure surface on the fluid layer of the target surface without any applied pressure. The first hierarchical cylinders may draw water away from the target surface sufficiently such that the water comes into contact with the negative features comprising the drilled holes. The drilled holes may apply a second capillary effect, which may draw the microstructure layer into intimate contact with the target surface.

One embodiment may consist of a flat substrate layer. Disposed on top of the substrate layer may be solid cylinders in a uniformly spaced square array. On top of each cylinder in the first pattern of cylinders may be disposed 1 to 10 solid cylinders of a smaller dimension. The interstitial areas between the first layer of pillars may comprise drilled cylindrical holes from the reverse side of the substrate layer. These reverse drilled holes do not communicate with the first side but stop 5-20 microns before drilling through. On the reverse side, piercings are made that are aligned so as to pierce the centers of the reverse-side drilled holes.

To make the piercing, a perforator, such as a needle, with a 1 to 10 micron diameter may be used. The fractal dimension of the drill holes may be in the range of 0.25 to 0.70. The capillary effect may be initiated by placing the microstructure surface on the fluid layer of the target surface without any applied pressure. The first hierarchical cylinders may draw water away from the target surface sufficiently such that the water comes into contact with the pierced surface of the substrate layer. A slight pressure may be applied, the piercings may act as valves and let fluid leave the interface layer through the reverse drilled holes, and not to return.

In one embodiment, the adhesive device may comprise a flat substrate layer. Disposed on top of the substrate layer may be solid cylinders in a uniformly space square array. Disposed on top of each cylinder in the first pattern of cylinders may be 1 to 10 solid cylinders of a smaller dimension. In the interstitial areas between the first layer of pillars may be an identical array of hollow pillars of the dimensions of the first layer of pillars. The fractal dimension of the hollow pillars may be in the range of 0.25 to 0.70 relative to the solid pillars. The capillary effect may be initiated by placing the microstructure surface on the fluid layer of the target surface without any applied pressure. The solid hierarchical cylinders may draw water away from the target surface in one aspect and the hollow pillars may draw water away from the target surface in another capillary aspect.

Hierarchical structures may be constructed commonly. For example, a uniform square grid of solid cylinders of varying height, such that said groups of solid cylinders form pyramidal structures. In this case, there may be a first capillary action between adjacent cylinders and a second capillary action between the larger formed pyramids. Such a surface may shift in dominance from one capillary action to another as pressure is applied, and the fine structure cylinders deform into more or less solid pyramids.

In some embodiments of the present invention, an adhesive surface may be combined with other adhesive techniques. For example, the inclusion of a chemical or viscous adhesive may be included. The use of suction cups that primarily work by creating a vacuum rather than capillary action. Solid adhesives, such as fiber Gecko structures, that create adhesion between the solid of the microstructured surface and a dry surface via van der Waals forces on a target surface that typically is wet at some later time.

Some embodiments of the present invention relate to microstructured surfaces that are more adhesive when wet or are more adhesive in the presence of a surfactant or hydrophobic liquid, such as oil. One of the distinguishing features of the present invention is the enhancement of Wenzel-Cassie effect by combining with capillary action.

The addition of the capillary effect aids in the formation of hydrophilic and hydrophobic zones, but also supplies a mostly normal force adhesivity. The Wenzel-Cassie effect and the capillary effect enhance each other's barrier to disruption. The surprising aspect of a capillary Wenzel-Cassie structure is that a mixed interface, for example of water and soap, increases both peel force and translational force. For example, adding a lubrication composition to an interface between a capillary Wenzel-Cassie surface and a target surface may increase adhesivity. Furthermore, aqueous environments may involve both hydrophobic and hydrophilic components. For example, water-oil emulsions may be encountered in many external environments. Water-lipid emulsions may be encountered in most biological environments. Even skin to surface environments, where high humidity is present, may comprise hydrophilic-hydrophobic interfaces. Examples are beverage containers, various skin contacting surfaces such as bandages, and industrial equipment where high grip is required.

The combination of capillary Wenzel-Cassie microstructures surfaces with conventional adhesives is of particular utility, since most conventional adhesives fail when exposed to oil or soap. Furthermore, a composite of visco-adhesive and microstructured adhesive would prevent transient failures, such as when an article is temporarily exposed to water or alternatively when a normally wet interface becomes dry.

In some embodiments, the adhesivity of the present invention is an effect that may build over time based on the ordering of molecular constituents at the microstructure surface target surface interface. There are additional benefits, for example, since surfaces of the present invention, especially those surfaces that may be elastomeric, tend to arrange their surface with respect to the target surface. Interfacing with irregular surfaces may require this accommodative effect, something seldom experienced with visco-adhesive surfaces, that stick wherever they first make contact. There may be considerable advantage in a surface that adheres to another surface in a way that their interface may not result in localized stresses, wrinkles, or folds.

In one embodiment of the present invention, the variation of attributes across a surface may be utilized. In some regions shear translations may be prevented, and in other regions peel translations may be prevented, and in still other regions both effects may be required. More broadly, it may be desired in some regions that shear translations are to be promoted with minimal force, and still other regions the peel force to be minimized.

One embodiment of the present invention may comprise a microstructured adhesive pressure-sensitive surface comprised of at least two microstructured patterns of different dimensions arranged hierarchically wherein at least one of the microstructured patterns is suctional or the hierarchical combinations creates a suctional aspect. A suctional aspect may comprise a negative feature that draws fluid away from the target surface when the microstructure adhesive surface is brought in contact with a surface comprising a fluid layer. The combination of the two patterns may create a zone of exclusion, characterized by microstructured water.

In some embodiments, an adhesive device may comprise a substrate layer onto which is embossed a two-dimensional pattern in such a way that both sides of the substrate layer exhibit a sinusoidal aspect. Furthermore, on top of the sinusoidal substrate layer is embossed solid cylinders (for example, micropillars) filling each complete square cycle of the sinusoidal pattern with between 10 and 100 equally spaced cylinders. On top of each cylinder in the first pattern of cylinders is embossed 1 to 10 solid cylinders (for example, micropillars) of a smaller dimension. Wherein the first and second layers of pillars create a zone of exclusion, and a microstructured water state. The capillary effect is initiated by placing the microstructure surface on the fluid layer of the target surface, and applying a slight pressure to deform the sinusoidal pattern into a flatter conformation, such that when the pressure is removed the sinusoidal aspect returns to its prior sinusoidal shaping generating a suctional force in combination with a capillary force generated by the close placement of the pillars.

DETAILED DESCRIPTION OF THE INVENTION

Reference will now be made in detail to the embodiments of the present disclosure, one or more examples of which are set forth herein below. Each embodiment and example is provided by way of explanation of the device, composition, and materials of the present disclosure and is not a limitation. Rather, the following description provides a convenient illustration for implementing exemplary embodiments of the disclosure. In fact, it will be apparent to those skilled in the art that various modifications and variations can be made to the teachings of the present disclosure without departing from the scope or spirit of the disclosure. For instance, features illustrated or described as part of one embodiment, can be used with another embodiment to yield a still further embodiment. Thus, it is intended that the present disclosure covers such modifications and variations as come within the scope of the appended claims and their equivalents. Other objects, features, and aspects of the present disclosure are disclosed in or are obvious from the following detailed description. It is to be understood by one of ordinary skill in the art that the present discussion is a description of exemplary embodiments only and is not intended as limiting the broader aspects of the present disclosure.

In order to overcome the problems of the prior art, understanding the variation of the contact angle formed between a microstructure surface and a water droplet as the surface texture varies is needed. The conventional understanding is based on chemically homogeneous smooth solid surfaces. The important variables are surface tensions of the solid-vapor, solid-liquid, and liquid-vapor interfaces. For a rough hierarchical surface, air or liquid may remain trapped in the surface asperities. Therefore, a fraction of the sample solid surface is directly in contact with the droplet total area, while the other fraction will first contact an air or liquid layer underneath the droplet. How the interface structure develops depends on the spatial size and distribution of hydrophobic and hydrophilic regions leading respectively to an air pocket and the precursor liquid film formation between hydrophilic and hydrophobic zones. Wenzel and Cassie-Baxter models need to be considered together to completely describe the wettability of a microstructured hierarchical surface.

It was known in the art that a combination of microstructured pattern and rheological properties may provide a means of producing pressure-sensitive adhesive layers of tapes and transfer coatings. The applicants have found that a combination of microstructured pattern and Wenzel-Cassie characteristics provide an improved pressure-sensitive microstructured adhesive surface.

Methods of Making Microstructured Surfaces

Figure 1:
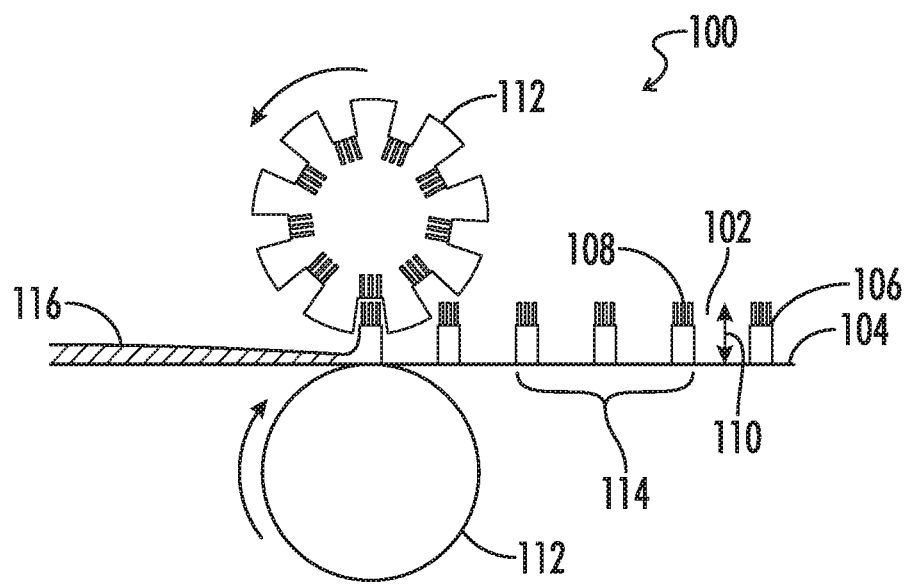
FIG. 1 is an illustration of a microstructured molding tool.

The depiction in FIG. 1 involves the use of a microstructured molding tool 100 to emboss a hierarchically arranged microstructure layer of a pressure-sensitive adhesive surface 102 having a planar surface 104 and first 106 and second 108 microstructures. The thickness of the microstructure layer 110 which is embossed by such microstructured molding tool 112 can vary depending upon the requirement of the final application. The microstructured layer 110 must be thick enough such that after embossing, a continuous unbroken microstructured surface 114 is obtained. Typically, the microstructured layer 110 is formed at a thickness of about 10 μm to about 250 μm, preferably about 50 to about 150 μm. In some embodiments, the thickness is 100 μm. The microstructured molding tool 112 is applied by rolling through flat stock 116, at a sufficiently slow rate and at a sufficient temperature and pressure to impart the desired features to provide a continuous microstructure layer 114 having a microstructured surface 110 (typically about 0.1 second to about 5 minutes at a temperature of about 20° C. to about 150° C.) depending on the materials and microstructure surface desired. The sample is allowed to cool on a flat surface, yielding a microstructured pressure-sensitive surface 114 which substantially replicates the shaping and pattern of the particular microstructured molding tool 112.

Figure 2:
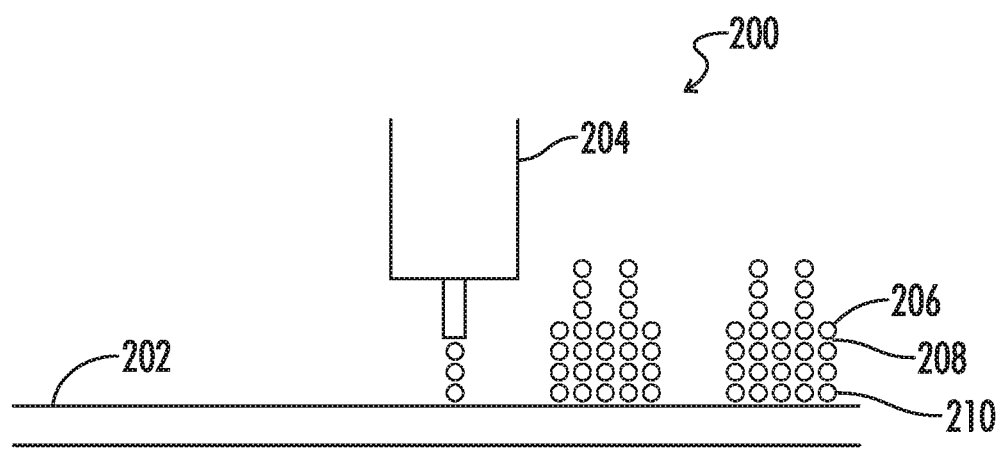
FIG. 2 is an illustration of a microstructure printing tool.

The second method illustrated by FIG. 2 involves printing a layer of pressure-sensitive microstructure 200 onto a flat substrate layer 202 using a microstructure printer 204. The structure 200 can be formed by a dot matrix printer which may print spheres 206 in a liquid state such that when deposited in succession touching dots fuse 208, and dots in contact 210 with substrate 202 fuse. After printing, the finished product may be allowed to cure or solidify on a flat surface. A two-dimensional array of hierarchical structures can be formed in this way.

Figure 3A:
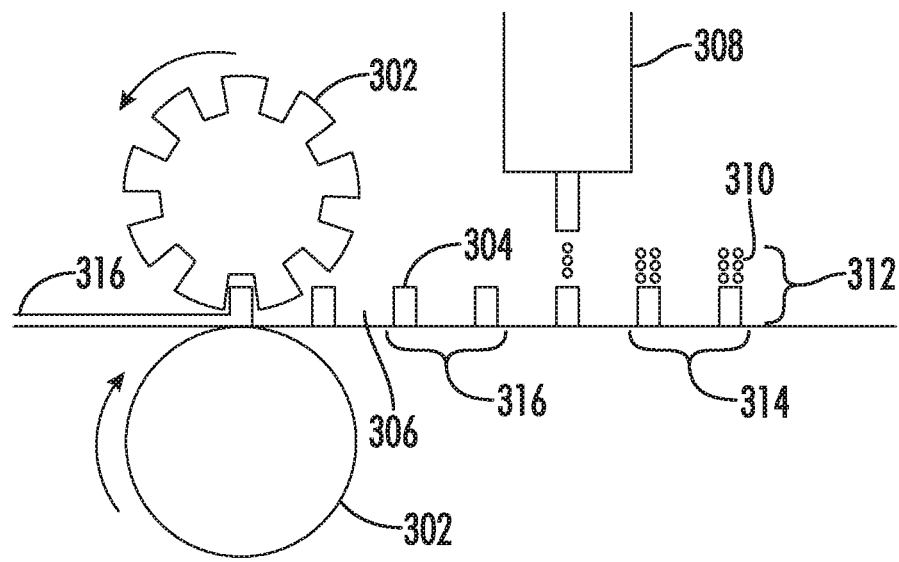
FIG. 3a is an illustration of a microstructure molding tool and printing tool being used together.

The third method illustrated by FIG. 3 involves the embossing of a first microstructure 304 followed by the printing of a second microstructure 310. This method involves the use of a microstructured molding tool 302 to emboss a layer of hierarchically arranged microstructure of a pressure-sensitive adhesive surface having a planar surface 306 and first 304 microstructure. A second microstructure layer 310 is printed 308. The thickness of the microstructure layer 312 can vary depending upon the requirement of the final application. The microstructured layer 312 may be thick enough such that after forming a continuous, unbroken microstructured surface 314 is obtained. Typically, the microstructured layer is formed at a thickness 312 of about 10 μm to about 250 μm, preferably about 50 to about 150 μm. The microstructured molding tool 302 may be applied by rolling through flat stock 316, at a sufficiently slow rate and at a sufficient temperature and pressure to impart the desired features to provide a continuous microstructure layer 314 having a micro structured surface 304 (typically about 0.1 second to about 5 minutes at a temperature of about 20° C. to about 150° C.) depending on the materials and microstructure surface desired. The sample is allowed to cool on a flat surface prior to the printing step, yielding a microstructured pressure-sensitive surface 316 which substantially replicates the shaping and pattern of the particular microstructured molding tool 302.

Microstructured Molding Tools

A microstructured molding tool is an implement for imparting a structure to planar, flat feedstock, and which may be continuously reused in the process. Microstructured molding tools can be in the form of a planar stamping press, a flexible or inflexible belt, or a roller (as depicted in FIGS. 1 and 2). Furthermore, microstructured molding tools are generally considered to be tools from which the microstructured adhesive pattern is generated by embossing, coating, casting, or platen pressing and do not become part of the finished microstructured adhesive article.

A broad range of methods are known to those skilled in this art for generating microstructured molding tools. Examples of these methods include but are not limited to photolithography, etching, discharge machining, ion milling, micromachining, and electroforming. Microstructured molding tools can also be prepared by replicating various microstructured surfaces, including irregular shapes and patterns, with a moldable material such as those selected from the group consisting of crosslinkable liquid silicone rubber, radiation curable urethanes, etc. or replicating various microstructures by electroforming to generate a negative or positive replica intermediate or final embossing tool mold.

Microstructured molds having random and irregular shapes and patterns can be generated by chemical etching, sandblasting, shot peening or sinking discrete structured particles in a moldable material. Additionally, any of the microstructured molding tools can be altered or modified according to the procedure taught in Benson U.S. Pat. No.

5,122,902. Finally, the microstructured molding tool must be capable of separating cleanly from the pressure-sensitive adhesive layer.

Microstructured Materials

Typically, the microstructured surfaces are made from materials selected from the group consisting of embossable or moldable materials having sufficient structural integrity to enable them to withstand the process of conveying the microstructure to the adhesive and be cleanly removed from the microstructured adhesive layer. Preferred materials which the microstructured surface may comprise include but are not limited to those selected from the group consisting of plastics such as polyethylene, polypropylene, polyesters, cellulose acetate, polyvinylchloride, and polyvinylidene fluoride, as well as paper or other substrates coated or laminated with such plastics.

Embossable coated papers or thermoplastic films are often siliconized or otherwise treated to impart improved release characteristics. As noted in the discussions of methods for making the surfaces of the present invention, depending on the method employed and the requirements of the final article, one or both sides of these surfaces must have release characteristics. For example, embossing can include a roller configuration in which one roller is a positive form and the other roller is a negative form, which mate together into forming the embossed surface as the planar feedstock is passed the embossing rollers.

Features of Microstructured Surfaces

The microstructured molding tools, feedstock, and, ultimately, the microstructured pressure-sensitive microstructured surfaces of the present invention have a multiplicity of projection features. The term "projection feature" as used herein covers both negative and positive configurations providing microstructured surfaces with positive and negative configurations, respectively. These features are commonly referred to as negative or positive structures by those who are familiar in the art of microstructured technology. Each feature should or typically have a height of about 2.5 micrometers to about 375 micrometers, preferably about 25 micrometers to about 250 micrometers, and most preferably about 50 micrometers to about 150 micrometers for reasons of minimizing thickness of the surface, increasing the density of the microstructured adhesive pattern sizes for symmetric patterns, and controlling the placement of microstructure levels.

The shape of the features in the microstructured molding tool and the microstructured pressure-sensitive microstructured articles prepared therefrom can vary. Examples of feature shapes include but are not limited to those selected from the group consisting of hemispheres, prisms (such as square prisms, rectangular prisms, cylindrical prisms and other similar polygonal features), pyramids, ellipses, and grooves. Positive or negative features can be employed, i.e. convex hemispheres or concave hemispheres, respectively. The preferred shapes include those selected from the group consisting of cylinders, sinusoids, hemispheres, pyramids (such as cube corners, tetrahedra, etc.), and "V" grooves, for reasons of pattern density, adhesive performance, and readily available methodology of the micro structured pattern generation or development. Although the exemplified features are non-truncated in nature, it is believed that truncated features will also be suitable in the articles of the present invention. The features of the microstructured surface may be systematically or randomly generated.

The limits of lateral dimensions of the features can be described by use of the lateral aspect ratio (LAR) which is defined as the ratio of the greatest microscopic dimension of the feature parallel to the plane of the continuous layer of feedstock to either the height of a positive feature or depth of a negative feature. Too large LAR leads to a short squat feature that would not provide the advantages of microstructuring. Too small a LAR would lead to a tall narrow feature which would not stand upright due to the low flexural modulus of the many elastomeric polymers (and therefore low flexural rigidity of the feature). That is, typical elastomers will not support too small a LAR whereas too large a LAR will not achieve the needed Wenzel-Cassie structure obtained from hierarchical placement of the microstructures. Typical limits of the LAR would be about 0.1 to about 10, with most preferred limits of about 0.2 and about 5.

The nearest neighbor distance between features can be specified with a spacing aspect ratio (SAR) given by the ratio of center-to-center nearest neighbor distance to feature the greatest lateral microscopic dimension as defined for the LAR. The minimum value the SAR can assume is 1 which corresponds to the sides of features touching. This value is most useful for features such as hemispheres and pyramids. For features such as rods, square prisms, rectangular prisms, inverted cones, hemispheres, and pyramids, the SAR should be greater than 1 so that the perimeters of the top of the features do not touch and so form a new planar surface. A typical upper limit for the SAR would be 5 and a more desirable upper limit would be 3. A most preferred upper limit would be 2.5. Although the precise arrangement of microstructures is strongly material dependent.

If the SAR is too great, positive features may not be able to support the hydrophilic phase of the interface layer of fluid above the substrate surface. This leads to disruption of the desired Wenzel-Cassie interface of contact between the microstructure surface and target surface. That is, the microstructure comprising the flat regions between positive features would touch the target surface. In either case of positive or negative features, carried to an extreme, a large SAR would lead to essentially a planar surface of contact. A pattern with asymmetry could be defined by multiple SARs. In the case of multiple SARs, all SARs should obey the limits listed above.

Reentrant Microstructures

Multiscale features and hierarchical arrangement may be used to produce capillary-enhanced adjacent hydrophobic-hydrophilic zones on a microstructured surface. When such a surface comes in contact with a fluid layer on a target surface, a Wenzel-Cassie interface may form which may be comprised of microscopic regions of hydrophilic fluid surrounded by microscopic regions of hydrophobic fluid or gas. One zone traps the other zones, which may result in high shear forces. In combination with capillary action, peel forces may also be enhanced.

If the surface energy difference between the hydrophobic zone and the hydrophilic zone is sufficient, then the water in the hydrophilic zone may become structured, resulting in a further increase in the barrier energy to disruption of the zones. In one embodiment, the formation of structured water may not be required for the present capillary enhanced Wenzel-Cassie zones, but in other embodiments it may be a preferred state, wherein extremely high peel strengths may be obtained.

In some embodiments, the contact between a microstructured surface of the present invention and a target surface comprises a three-phase line (e.g., liquid/solid/gas). If a portion of the microstructured surface is concave (re-entrant), then the three-phase interface may be more stable.

For example, a surface pattern may be built of small holes upon larger scale grooves, the holes may trap air and promote large contact angle, whereas larger grooves are filled by water and may prevent water sliding. The opposite situation may also occur, when small holes may be wetted while larger ones hold air pockets. Under some circumstances a Cassie-Baxter to Wenzel partition may be caused by small vibration.

The stability of the Cassie-Baxter state for different shapes of roughness patterns may depend on the potential barrier separating the Cassie-Baxter and Wenzel states. The different shapes may include spheres and spherical cavities, pillars with changing cross section (overturned cones) and with side facets. For hydrophobic surfaces, the multiscale roughness may increase the potential barrier for the wetting transition. In some embodiments, inherently hydrophilic materials may appear hydrophobic when the energy gain due to the wetting of a hydrophilic pore is overcompensated by the energy loss due to the growth of a water-air interface. This can lead to the apparent hydrophobicity of an inherently hydrophilic material when an appropriate pattern is introduced. The potential energy barriers to the conversion of Cassie-Baxter to Wenzel state transition may be created due to widening of the gap between the posts while if a capillary effect is present then the liquid-air front propagates. This may increase the liquid-air interface area and, therefore, the net energy term may be proportional to the liquid-air interfacial area times the surface tension of the liquid.

The concave topography may be particularly significant for the oleophobicity involving the resistance to wetting by low interfacial energy liquids, such as non-polar organic oils and hydrocarbons. The Wenzel state may not enhance liquid repellent for such materials, while the Cassie-Baxter state may tend to be unstable. Therefore, re-entrant surface topography may be used for the surface's oleophobicity, since it is capable of pinning the liquid-air interface and stabilizing the Cassie-Baxter state. In one embodiment, the double reentrant topography can further enhance the stabilizing effect even for extremely low surface tension liquids.

Capillary Structures with Hydrophobic Surface

In some embodiments, a larger structure which is capillary attractive may be stabilized by making the inner capillary surface hydrophobic. This may impart an irreversible capillary effect. A liquid droplet placed on a geometrically textured surface may take on a "suspended" state, in which the liquid wets only the top of the surface structure, while the remaining geometrical features are occupied by vapor. This superhydrophobic Cassie-Baxter state may be characterized by its composite interface, which is intrinsically fragile and, if subjected to certain external perturbations, may collapse into the fully wet Wenzel state.

It should be noted that the hydrophobicity at one scale may inherit a similar propensity on a larger scale. The concept of hierarchical surface structures for perpetual superhydrophobicity can be illustrated by a micrometer scale, which realizes a perpetual nano-Cassie-Baxter state, and the other on the structure with a 10-micrometer (or larger) scale, which inherits the stability of the smaller scale. The perpetual superhydrophobicity may be obtained with the complete thermodynamic elimination of the Wenzel state. By utilizing hierarchical surface structures, which exploit the perpetual superhydrophobicity of the micronscale textures, in combination with the wedge drying phenomenon at larger scales, one may obtain this superhydrophobicity.

Water/Oil Interfaces Under Capillary Action

A tube comprised of a hydrophobic material may have a negative capillary rise, that is the level of water in the tube when pressed into the water will be lower than the surrounding water surface. A tube comprised of a hydrophilic material may have a positive capillary rise, that is the level of water in the tube is higher than the level of the water surrounding the tube. Hence, using this difference, one may use capillaries of different hydrophilicity to control the equilibrium between hydrophilic Wenzel zones and hydrophobic Cassie zones. Capillaries in a microstructured surface can determine Cassie to Wenzel transitions, or support the stability of a Wenzel-Cassie equilibrium between two zones, one in the Wenzel state and the other in the Cassie state.

There are four distinct phenomena regarding microlines and the evolution of an oil-air/water interface between two neighboring microlines during capillary action on water droplets. First, when a water droplet gradually shrinks, the oil-air/water interface between two neighboring microlines increased its deflection but decreased its angles with the sidewalls of these two microlines. The two edges of this interface are still at the top corners of the two microlines. Once water passes the top corners of these two microlines, it keeps moving down and filling the gap between the two microlines. Third, as the water droplet shrinks, the number of microlines on which the droplet sits also decreases. The gaps between microlines might not be filled spontaneously by water when transition occurs. Instead, it is more likely the gaps between the microlines are filled incrementally. The pressure may not be uniform inside the droplet or the microlines may not be exactly identical. Either cause leads to the occurrence of filling phenomena.

Figure 3B:
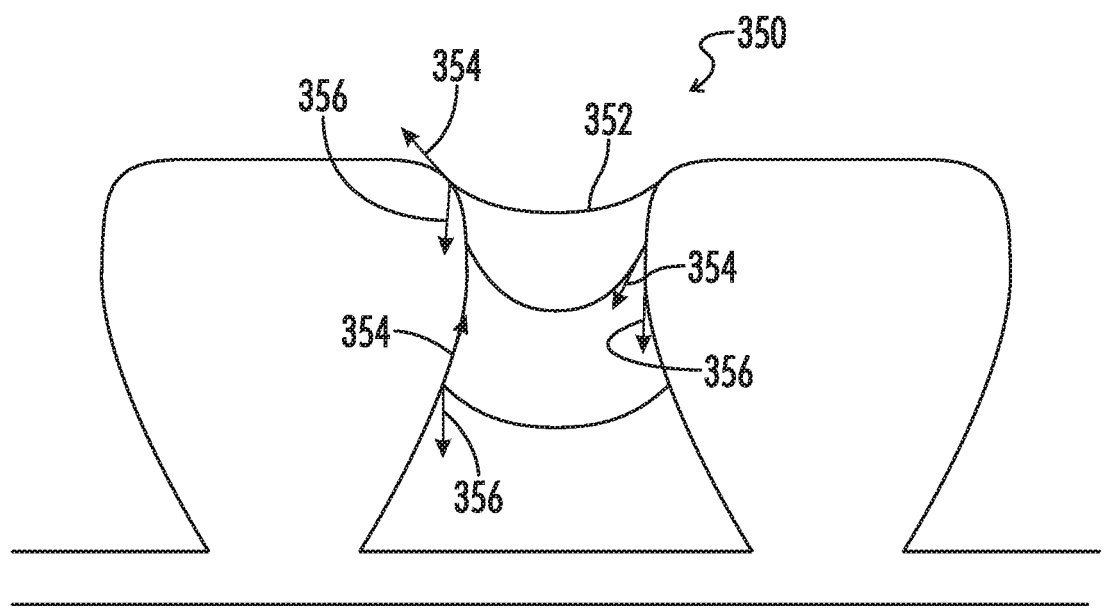
FIG. 3b is cross-sectional view of a microstructure adhesive capillary structure demonstrating gas/liquid interfaces.

Referring now to FIG. 3b, a cross-section view of a microstructure adhesive capillary structure 350 with an air/water interface 352 between two neighboring microlines. The intrinsic contact angle 354 with a microline and the angle 356 between the advancing angle and the vertical are also shown.

Water/Surfactant Interfaces Under Capillary Action

In some embodiments, surfactants may be compounds that lower the surface tension (or interfacial tension) between two liquids, between a gas and a liquid, or between a liquid and a solid. Surfactants may act as detergents, wetting agents, emulsifiers, foaming agents, and dispersants. The applicants have surprisingly discovered that surfactants that generally lubricate an interface increases the resistance to shear translation and peel force when at least one of the surfaces is a microstructured surface. It was found that surfactants reinforce the boundaries between Wenzel and Cassie phases, thus phase lock the interface. Surfactants may be particularly useful on target surfaces that are coated with a high viscosity liquid.

In the bulk aqueous phase of an interface, surfactants may form aggregates, such as micelles, where the hydrophobic tails form the core of the aggregate and the hydrophilic heads are in contact with the surrounding liquid. These micelles may align along the surfaces between hydrophobic regions and hydrophilic regions of the microstructured adhesive surface. Other types of aggregates can also be formed, such as spherical or cylindrical micelles or lipid bilayers. These lipid bilayers can be associated with microstructured surfaces in which the pitch is varying. The shape of the aggregates may depend on the chemical structure of the surfactants. In some embodiments the structure may depend on the balance in size between the hydrophilic head and hydrophobic tail, as well as the height, diameter and pitch of the microstructures. Surfactants may also reduce the surface tension of water by adsorbing at the liquid-air interface. This effect may reduce capillary rise.

The dynamics of surfactant adsorption may affect the adhesive properties of a microstructured surface. In some embodiments, surfactants can stabilize the adhesive boundaries between hydrophilic and hydrophobic zones in the interface, a Wenzel-Cassie structure, if there is a flow condition. For example, where bubbles or drops are rapidly generated by the target surface and need to be stabilized surfactants may be utilized. The dynamics of adsorption depend on the diffusion coefficient of the surfactant. As the interface is created, the adsorption is limited by the diffusion of the surfactant to the interface. In some embodiments, there can exist an energetic barrier to adsorption or desorption of the surfactant. This may be the case when the surfactant enhances either translational grip or peel grip. If such a barrier limits the adsorption rate, the dynamics may be 'kinetically limited'. Such energy barriers may be due to steric or electrostatic repulsions. The surface rheology of surfactant layers, including the elasticity and viscosity of the layer, may play an important role in the stability of Wenzel-Cassie structures in an interface between a microstructured surface and a target surface.

The surfactant may be applied selectively to the microstructured surface, for example on the top (smallest) features, or in the valleys of the largest features. The surfactant may be applied as a liquid coating or a solid coating.

Surfactants may include soaps obtained by treating vegetable or animal oils and fats with a strong base, linear alkylbenzenesulfonates, lignin sulfonates, fatty alcohol ethoxylates, and alkylphenol ethoxylates.

The "tail" of most surfactants may be fairly similar, consisting of a hydrocarbon chain, which can be branched, linear, or aromatic. Fluorosurfactants have fluorocarbon chains. Siloxane surfactants have siloxane chains. Many important surfactants include a polyether chain terminating in a highly polar anionic group. The polyether groups often comprise ethoxylated sequences inserted to increase the hydrophilic character of a surfactant. Polypropylene oxides, conversely, may be inserted to increase the lipophilic character of a surfactant. Surfactant molecules may have either one tail or two; those with two tails are said to be double-chained.

Surfactants may be classified according to the composition of their head: nonionic, anionic, cationic, amphoteric. A non-ionic surfactant has no charged groups in its head. The head of an ionic surfactant carries a net positive, or negative charge. If the charge is negative, the surfactant is more specifically called anionic; if the charge is positive, it is called cationic. If a surfactant contains a head with two oppositely charged groups, it is termed zwitterionic.

Anionic surfactants contain anionic functional groups at their head, such as sulfate, sulfonate, phosphate, and carboxylates. Prominent alkyl sulfates include ammonium lauryl sulfate, sodium lauryl sulfate, and the related alkyl-ether sulfates sodium laureth sulfate, and sodium myreth sulfate.

Cationic surfactants include permanently charged quaternary ammonium salts: Cetrimonium bromide, Cetylpyridinium chloride, Benzalkonium chloride, Benzethonium chloride, Dimethyldioctadecylammonium chloride and Dioctadecyldimethylammonium bromide.

Zwitterionic surfactants have both cationic and anionic centers attached to the same molecule. The cationic part is based on primary, secondary, or tertiary amines or quaternary ammonium cations. The anionic part can be more variable and include sulfonates, as in the sultaines 3-[(3-Cholamidopropyl) dimethylammonio]-1-propanesulfonate and cocamidopropyl hydroxysultaine. Betaines such as cocamidopropyl betaine have a carboxylate with the ammonium. The most common biological zwitterionic surfactants have a phosphate anion with an amine or ammonium, such as the phospholipids phosphatidylserine, phosphatidylethanolamine, phosphatidylcholine, and sphingomyelins.

Nonionic surfactants have covalently bonded oxygen-containing hydrophilic groups, which are bonded to hydrophobic parent structures. The water-solubility of the oxygen groups is the result of hydrogen bonding. Hydrogen bonding decreases with increasing temperature, and the water solubility of nonionic surfactants therefore decreases with increasing temperature. Nonionic surfactants are less sensitive to water hardness than anionic surfactants. The differences between the individual types of nonionic surfactants are slight. They include: ethoxylates, Fatty alcohol ethoxylates (narrow-range ethoxylate, octaethylene glycol monododecyl ether, pentaethylene glycol monododecyl ether), Alkylphenol ethoxylates (Nonoxynols, Triton X-100), Fatty acid ethoxylates, Special ethoxylated fatty esters and oils, Ethoxylated amines and/or fatty acid amides (Polyethoxylated tallow amine, Cocamide monoethanolamine, Cocamide diethanolamine), Terminally Blocked Ethoxylates (Poloxamers), Fatty Acid Esters of Glycerol (Glycerol monostearate, Glycerol monolaurate), Fatty Acid Esters of Sorbitol (Sorbitan monolaurate, Sorbitan monostearate, Sorbitan tristearate), Tweens, Fatty Acid Esters of Sucrose, Alkyl Polyglucosides (Decyl glucoside, Lauryl glucoside, Octyl glucoside), Amine oxides, Sulfoxides, Phosphine oxides.

Figure 4:
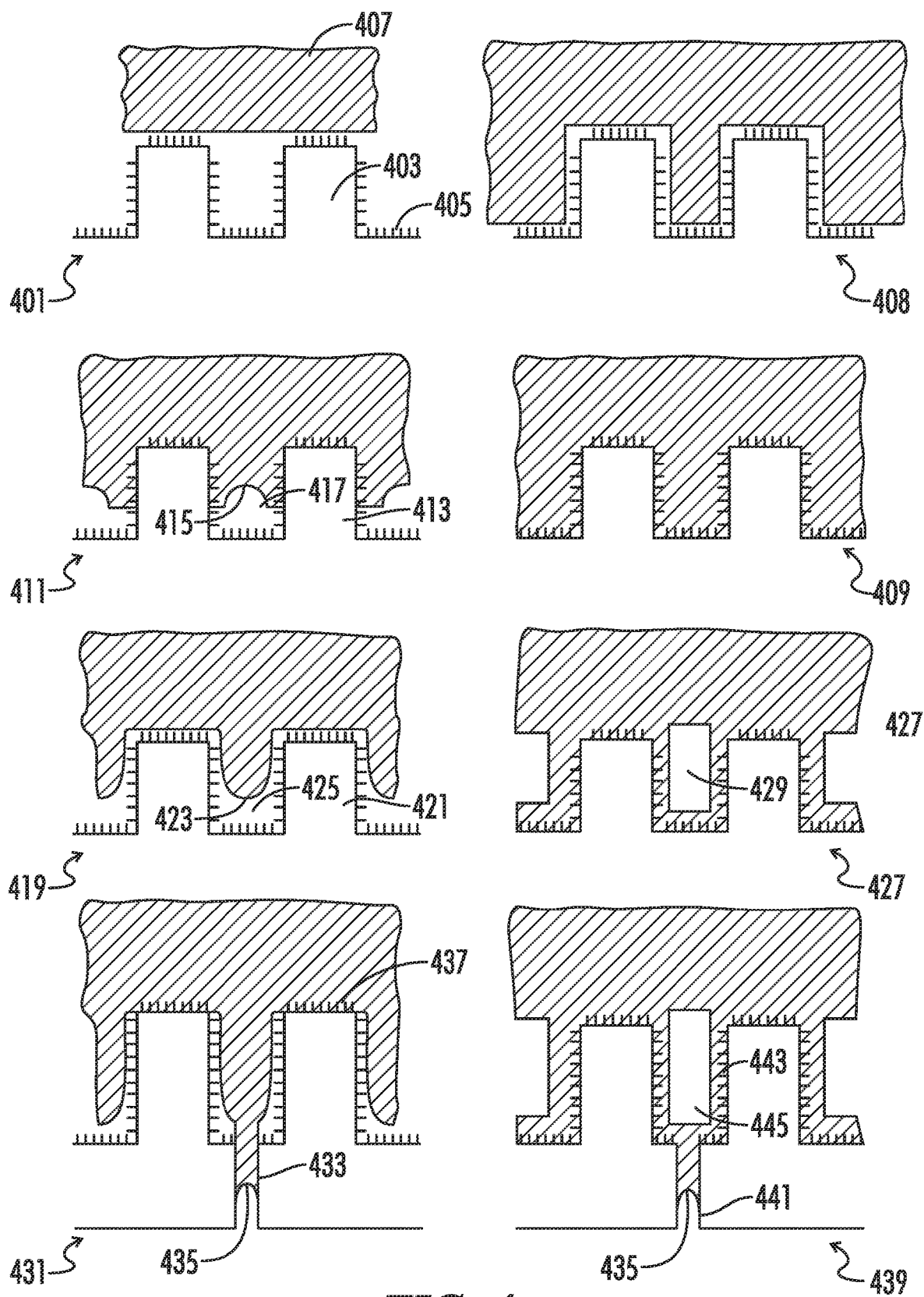
FIG. 4 is a diagram of cross-sectional views of various wetting interfaces between a surface and liquid/gas.

FIG. 4 illustrates an embodiment of Wenzel-Cassie and Cassie-Baxter capillary wetting surfaces 401. The surface 401, a first microstructure 403, a second microstructure 405, and a hydrophilic liquid 407 are depicted. Adopting the convention that the first mentioned term refers to the wetting state of the first microstructure and the second mentioned term refers to the wetting state of the second microstructure, then 401 depicts a Cassie-Cassie wetting state (also referred to as a Cassie-Baxter state). Referring to 408, the wetting state depicted is a Wenzel-Cassie wetting state. Referring to 409, the wetting state depicted is a Wenzel-Wenzel wetting state. Referring to 411, a hydrophilic surface 413 may create a positive capillary effect in a generally Wenzel-Wenzel wetting state where air 417 is trapped. However, in 411 the trapped air 417 comprises a Wenzel-Cassie state, and in this geometry may be adhesive. Referring to 419, hydrophobic surface 421 may create a negative capillary effect in a generally Wenzel-Cassie wetting state where air 425 is trapped. Notice in 411 the meniscus 415 is convex and in 419 the meniscus 423 is concave. Referring to 427, the wetting state depicted is a Cassie-Wenzel wetting state, which includes trapped air 429. Referring to 431, generally the wetting state depicted is Wenzel-Cassie, where a hole 433 is disposed in the substrate. The substrate of the microstructured surface may comprise a top layer and bottom layer with an interior disposed therein. The hole 433 may be disposed within the interior and connect to the top surface, bottom surface, or both. The substrate of the microstructured surface may be hydrophilic, and hence the meniscus 435 is convex. Note in 431, the capillary action of hole 433 has created a downward pressure that has caused the top second microstructure 437 to be in a Wenzel state. Referring to 439, generally the wetting state depicted is Cassie-Wenzel, where a hole 441 is disposed in the substrate's interior and connected to the top surface, bottom surface, or both. The substrate of the microstructured surface may be hydrophilic, and hence the meniscus 435 is convex. Note in both 431 and 439, the local interfaces may evolve over time. For example, in 431, second microstructure 437 may have begun in a Cassie state and evolved into a Wenzel state. In 439, the second microstructure 443 is fully wetted and acts as a conduit to hole 441 past the trapped air 445.

It will be obvious to those skilled in the art that more elaborate wetting states would be obvious for a three-tier microstructure as depicted. For example, some embodiments may include holes disposed in the pillars. For example, the pillars may have an exterior and interior with a hole or depression extending from the exterior into the interior. If a hydrophilic liquid such as water comes in contact with a hydrophilic lined hole the water may be caused to flow into the hole. If a hydrophilic liquid such as water comes in contact with a hydrophobic lined hole the water my be caused to resist flowing into the hole, or more generally the hole may anchor a trapped air bubble. Consequently, holes can act as local zones of influence, making surrounding structures Wenzel wetting when the surrounding structures without the hole are Cassie wetting, or conversely. Indeed, the time evolution that is characteristic of Wenzel-Cassie capillary wetting states is one of the distinguishing features of these microstructures. While capillary action may exist between solid cylinders, as illustrated in FIG. 4, the more common capillary action may be associated with cylindrical voids, and more generally with depressions.

Figure 5:
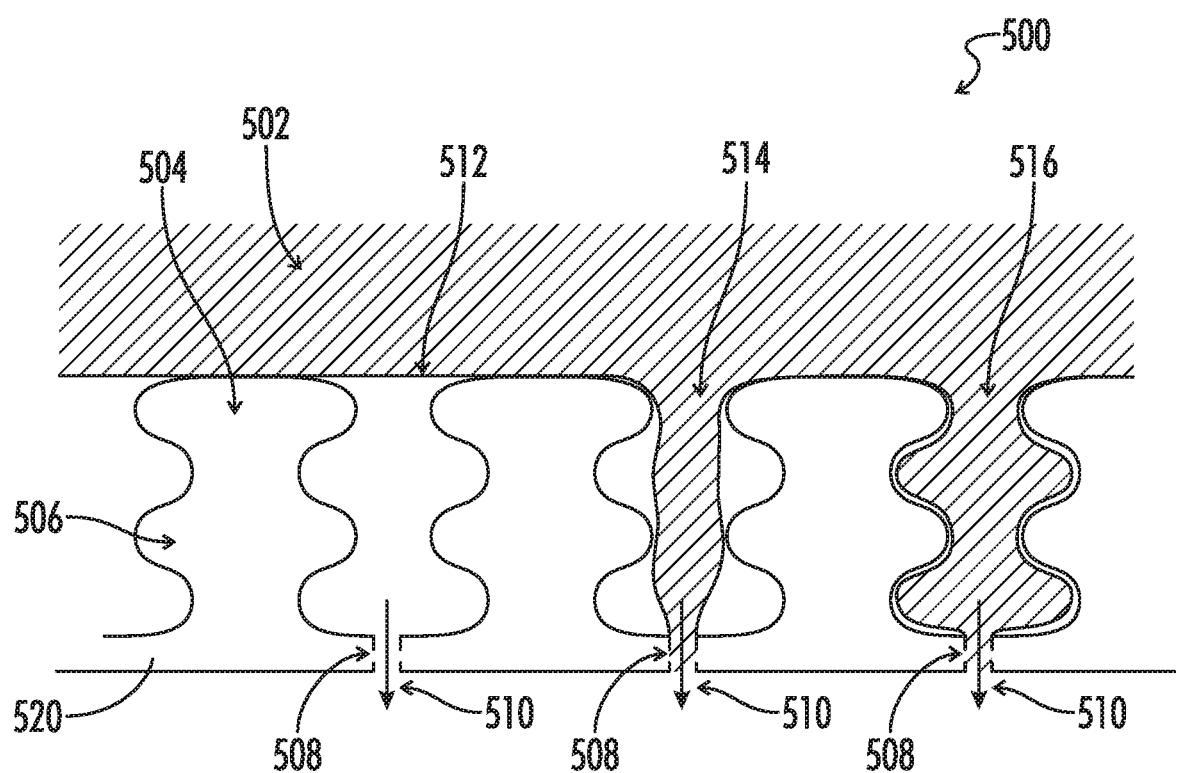
FIG. 5 is a cross-sectional view of an interface between a 2-tier microstructure surface and liquid/gas.

In one embodiment, a capillary structure of use in the present invention may include the 2-tier microstructure depicted in FIG. 5. In a 2-tier microstructure, the microsurface 500 may comprise a microstructure 503 that has an exterior 505 and an interior 507, wherein a hole or depression 509 may extend from the exterior to the interior. FIG. 5 identifies a microsurface 500 that is depicted with reference to liquid interface 502. Another way to describe the microstructured surface 500 includes the microsurface comprised of first microstructure 504, second microstructure 506, and capillary structure 508 (depicted as a cylindrical hole). Capillary action is shown by arrow 510. The wetting state 512 may be a Cassie-Cassie state. The wetting state 514 may be a Wenzel-Cassie capillary state. The wetting state 516 may be a Wenzel-Wenzel capillary state. State 512 may not be adhesive, and state 514 may be adhesive. In some embodiments, if adjacent cells do not possess holes (capillary structure) 508, then they will be Cassie-Cassie 512, and intermediate cells with holes 508 may eventually become Wenzel-Wenzel 516 (depending on the substrate 520 material), then the total wetting state is Cassie-Cassie-Wenzel-Wenzel, which can be highly adhesive, depending on the surface energy of the liquid phase.

Figure 6:
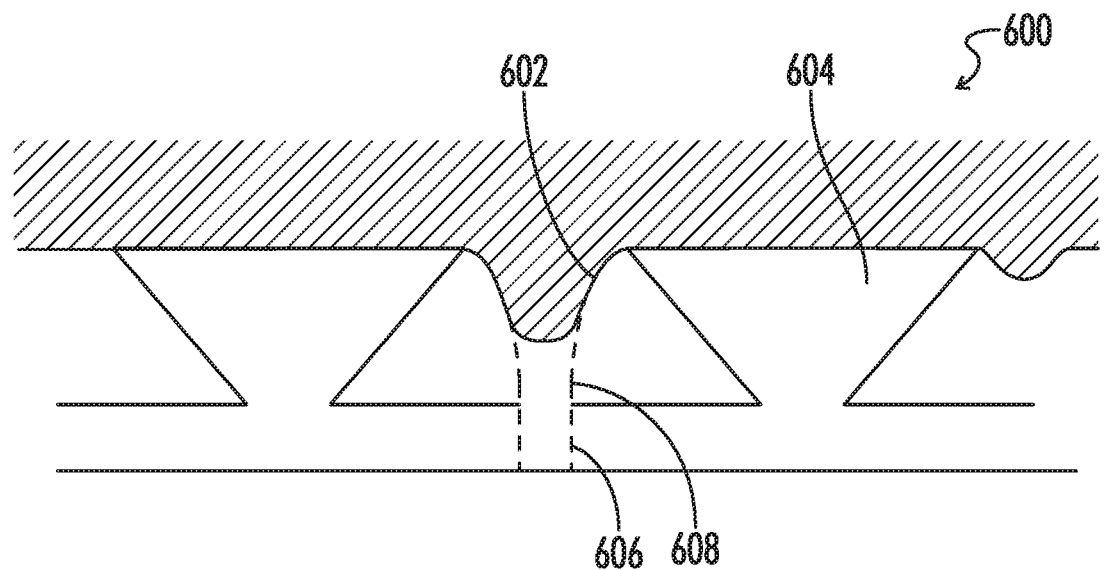
FIG. 6 is a cross-sectional view of an interface between a 1-tier capillary microstructure and liquid/gas.

In another embodiment of the present invention, a capillary structure may include the 1-tier microstructure as depicted in FIG. 6. Microstructure 600 is depicted with reference to liquid interfaces 602. The microstructured surface 600 is comprised of first microstructure 604 and capillary structure 606 (depicted as a cylindrical hole). If the capillary structure 606 is absent the surface wetting is described by 602, which can be considered an adhesive Cassie state. When capillary structure 606 is present then the interface is 608, and is considered a Cassie capillary state, which is considerably more adhesive.

Figure 7:
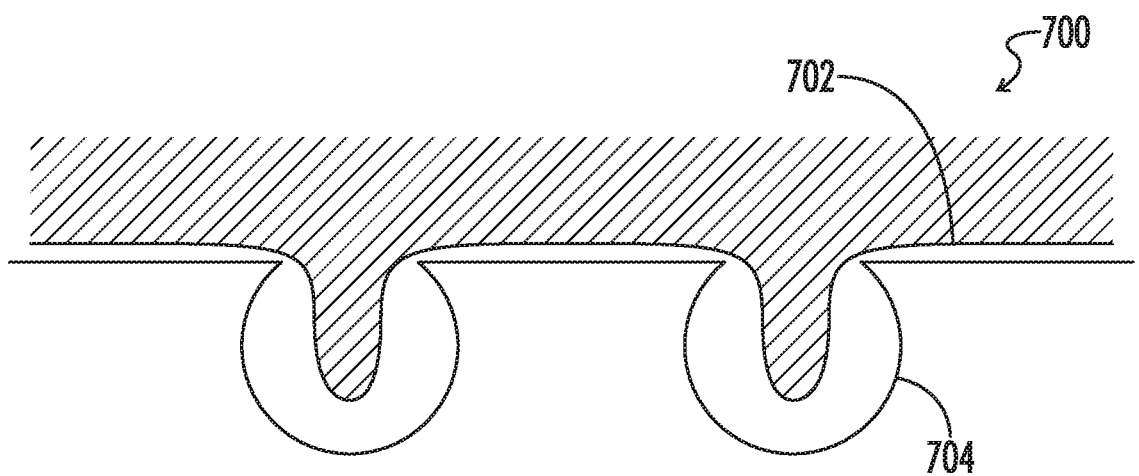
FIG. 7 is a cross-sectional view of an interface between a 1-tier capillary microstructure and liquid/gas.

In yet another embodiment of the present invention, a capillary structure may include the 1-tier microstructure depicted in FIG. 7. Microstructure 700 is depicted with reference to liquid interface 702. The microstructured surface is comprised of first microstructure 704 which acts also as a capillary structure (depicted as a spherical pore).

Capillary structure that has one side open to the ambient atmosphere may have stronger capillary action because the motion of fluid into the capillary structure is not resisted by the work required to compress a gas in a capillary structure that is not open to the ambient atmosphere. Structures that have recurvature, as illustrated in FIGS. 6 and 7 are called reentrant microstructures.

Figure 8:
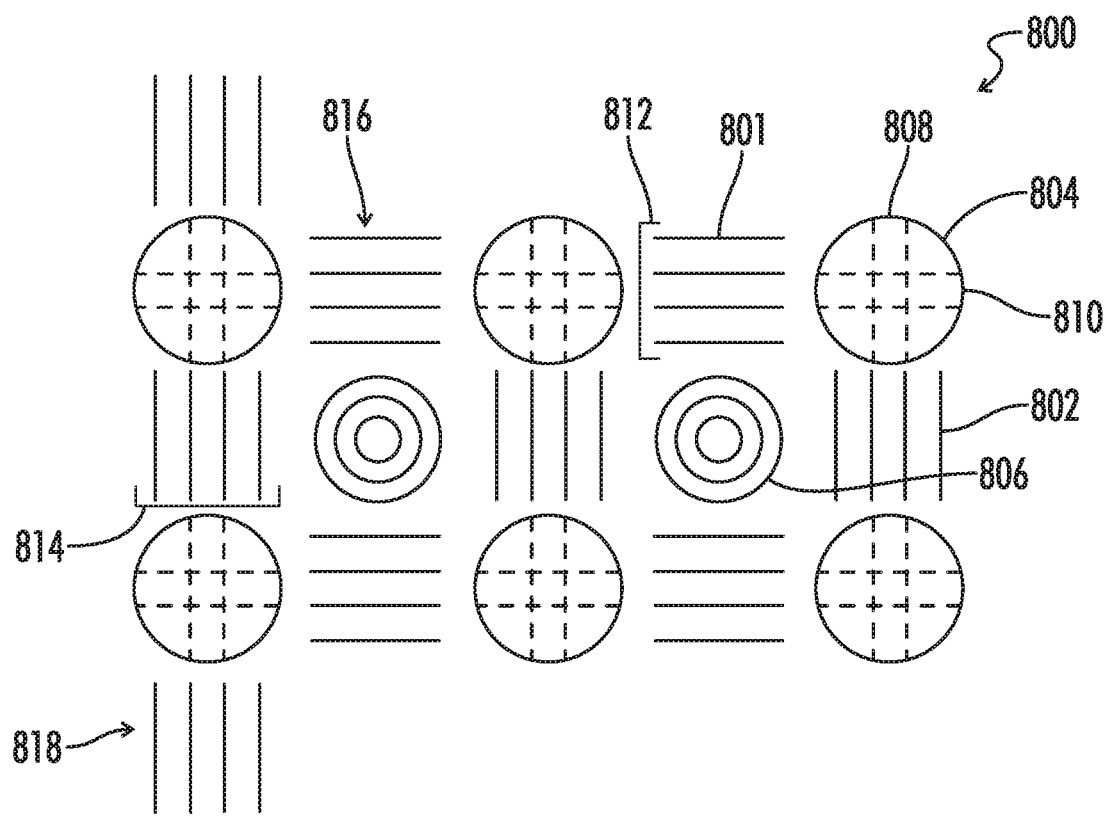
FIG. 8 is a top view of a multi-tier microstructured surface.

Referring now to FIG. 8, an embodiment depicts a birds-eye-view of a multi-tier microstructured surface 800, which may be comprised of latitudinal ridges 801, longitudinal ridges 802, cylinders 804, and targets 806. Cylinders 804 comprise two or more latitudinal through holes 808 and longitudinal through holes 810 such that each set of holes 808, 810 are not at the same height and they do not communicate (or intersect). The cylinders 804 may comprise a diameter in the range of 10 to 50 microns, height of between 10 to 150 microns, pitch between 20 and 200 microns, and may have a second tier of smaller cylinders disposed on the top portion of the cylinder (not pictured). The targets 806 may be comprised of tiered columns, wherein the the tiers comprise a diameter in the range of 10 to 50 microns, height of between 10 to 150 microns, and pitch between 20 and 200 microns. The latitudinal ridges 801 and longitudinal ridges 802 may comprise a thickness between 5 to 50 microns, height between 2 and 150 microns, and pitch between 5 and 50 microns with the dimensions being determined within each of the regions 812 and 814. The through holes 808 and 810 may be any profile, including circular, oval, rectangular, star, a polygon, or any other shape suitable for the flow of a liquid, gas, or solid state. The through holes may be oriented such that 808 aligns with 802 and 810 aligns with 801.

The mechanism of action of microstructure surface 800 may be capillary. Capillary action may occur between the ridges of 812 and 814. The capillary action from one segment 812, 814 may connect to another segment 816, 818 (respectively) via the capillary action of through holes 808 and 810. The targets 806 may also have capillary action but their primary purpose is to gradually link longitudinal flow vectors to latitudinal flow vectors. A complicated structure as depicted in FIG. 8 may take several minutes to equilibrate to its lowest energy state (most adhesive). This temporal feature of the microstructured surface 800 interface with a liquid may be advantageous over the prior art applications where frequent repositioning of the microstructured surface with respect to a target surfaces is anticipated. Microstructured surfaces such as 800 comprising target structures 806 may be locked to their target surfaces by applying a slight normal force, which may place the target surfaces 806 into a suctional state.

Another embodiment of a microstructured surface that operates similarly to the structure depicted in FIG. 8 may be constructed by filling in through holes 808 and 810 and populating the side surfaces of cylinders 808 with microstructures, similar to those previously depicted in FIG. 4. In such an embodiment, fluid may flow from longitudinal ridges 802, around the microstructures on 808 and into latitudinal ridges 801.

It should be understood that the embodiments provided in FIGS. 4-8 are highly symmetric depictions. In many self-organizing systems, and in biological systems generally, dimensions are only approximately maintained. Consequently, the surprising aspects of the inventive microstructured surfaces do not rely on a high degree of symmetry and may work according to their intended purpose when dimensions such as diameter, height and pitch vary over the surface of the microstructured surface. There may be certain advantages to be realized in varying these dimensions periodically, such that the periodical variation may become an advantageous structure in itself. For example, a uniform grid of solid cylinders like that of the prior art may be given a larger scale microstructure by varying their amplitude. Such variations may include sinusoidal, rectangular, pyramidal, and the like structures.

In appreciation of the above observation, the applicants define a self-similar microstructured surface as an at least 2-tier microstructured surface comprising now a first microstructure that is smaller in dimension than a second microstructure, such that the first microstructure is of small dimensions, but a second microstructure is formed by spatially shaping a multiplicity of the first microstructures. These self-similar structures have enhanced capillary action.

Figure 9:
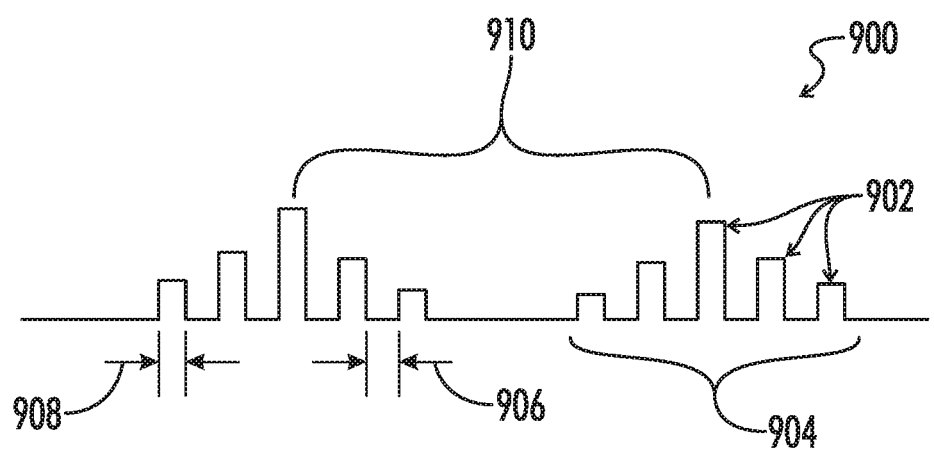
FIG. 9 is a cross-sectional view of a pyramidal microstructure.

Referring now to FIG. 9, microstructures surface 900 may be comprised of solid cylinders 902 arranged in a pyramidal geometry 904. The pyramidal geometry 904 may be comprised of cylinders 902 with a constant pitch of between 20 to 100 microns depicted at 906, a diameter of between 10 to 100 microns depicted at 908, and a pyramidally varying height. The pyramidal geometry 904 can be disposed in a two-dimensional grid comprising pitch 910.

Figure 10:
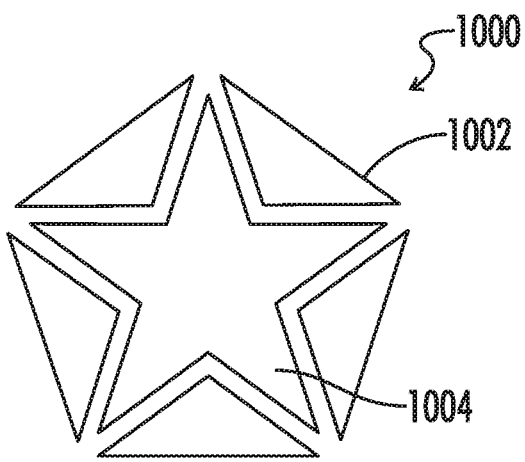
FIG. 10 is a top view of an interlocking geometry microstructure.
Figure 11:
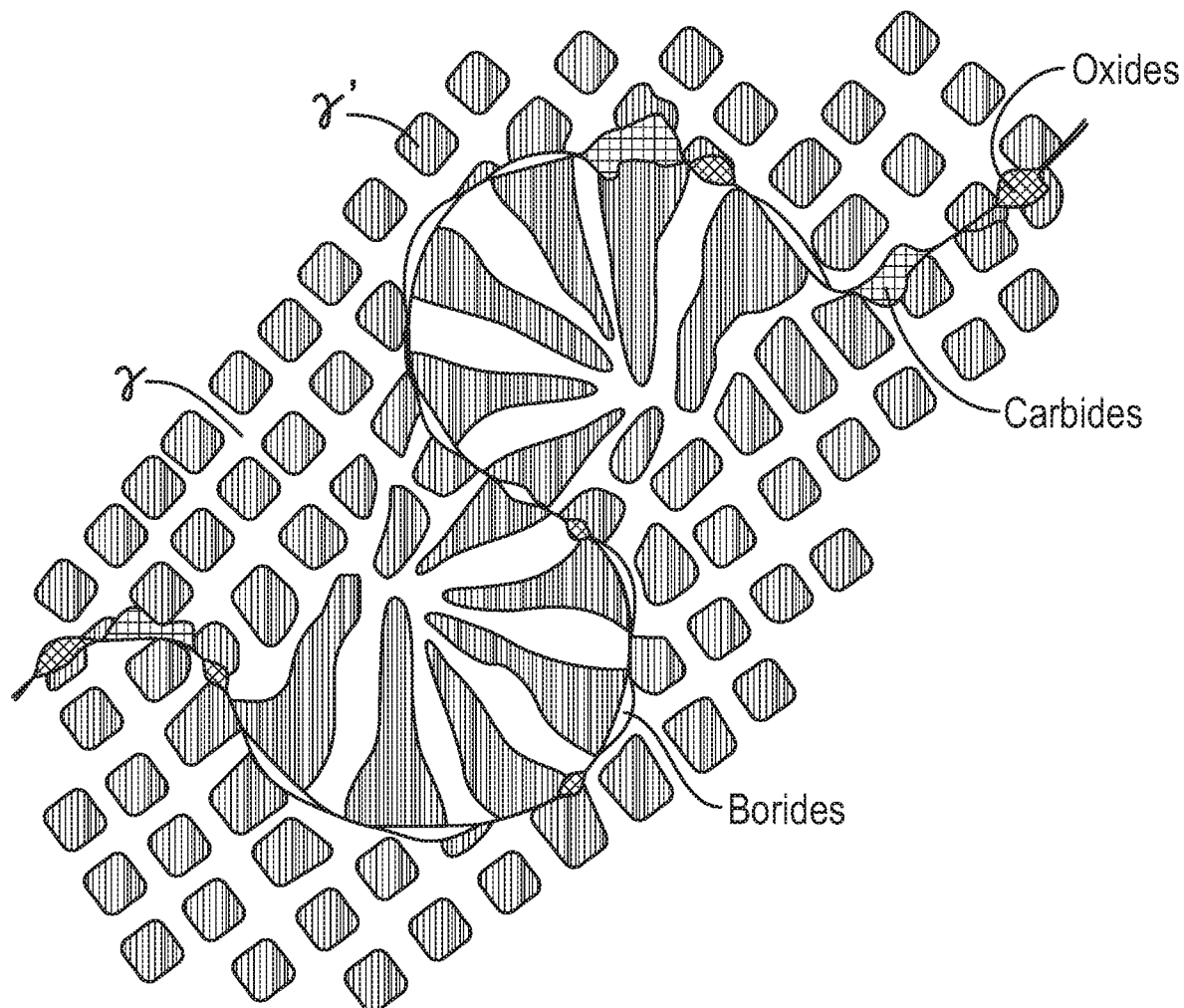
FIG. 11 is a top view of interlocking microstructured surfaces.

Referring to FIG. 10 is a birds-eye-view, and one embodiment of an interlocking geometry 1000 which may be comprised of pillars of triangular cross section 1002 and a central pillar 1004 of star cross section. Repetitions of these interlocking patterns may be employed in any self-similar microstructure. Generally, any microstructure as exemplified by the embodiments of FIGS. 4-10 may be sculpted into a second higher dimensional microstructure.

Alternatively, there are many biological structures that exhibit high capillary activity, similar to that as illustrated in FIG. 10, where radial capillary action distributes to a square matrix. The regular grid of microstructure incorporating amorphous capillary microstructure may be especially useful regarding adhesion to target surfaces that are heterogenous. For example, in one embodiment an interface comprised of water and oil, or water and soap, or any interface where one phase is responsive to capillary action and another phase is responsive to Wenzel-Cassie organization may benefit from an amorphous capillary microstructure.

Figure 12:
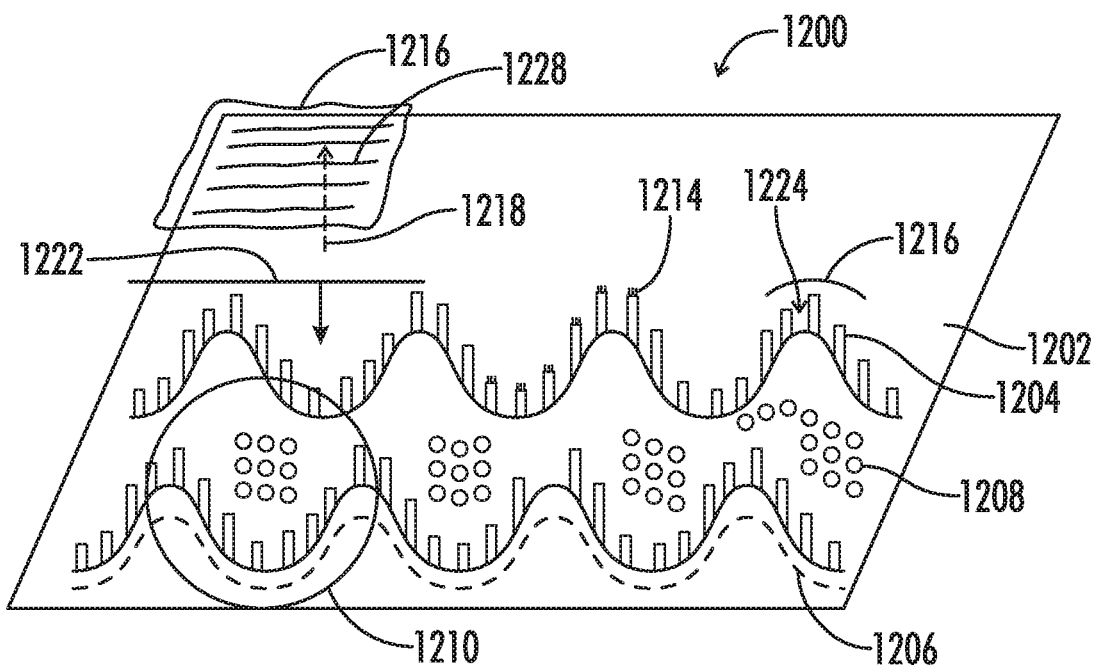
FIG. 12 is a perspective view of an adhesive device comprising three microstructured patterns.

Referring now to FIG. 12, a microstructured adhesive pressure-sensitive surface 1200 may be comprised of three microstructured patterns of different dimensions arranged hierarchically wherein at least one of the microstructured patterns is suctional or the hierarchical combinations creates a suctional aspect. In one embodiment, the structure consists of a substrate layer 1202 onto which is embossed a two-dimensional pattern in such a way that both sides of the substrate layer may exhibit a sinusoidal pattern 1204 and 1206. Furthermore, on top of the sinusoidal pattern 1204, 1206 is embossed solid cylinders (for example, micropillars) 1208 filling each complete square cycle 1210 of the sinusoidal pattern with between 10 and 100 equally spaced cylinders. In a hierarchical fashion, on top of each cylinder 1208 in the first pattern of cylinders is embossed 1 to 10 solid cylinders (for example, micropillars) 1214 of a smaller dimension. The capillary effect may be initiated by placing the microstructure surface on the fluid layer 1216 of the target surface, and applying a slight pressure 1218 to deform the sinusoidal pattern into a flatter conformation 1228, such that when the pressure is removed the sinusoidal aspect returns to its prior sinusoidal shaping 1204, 1206 generating a suctional force 1222 in combination with a capillary force 1224 generated by the close placement of the cylinders 1208.

Figure 13:
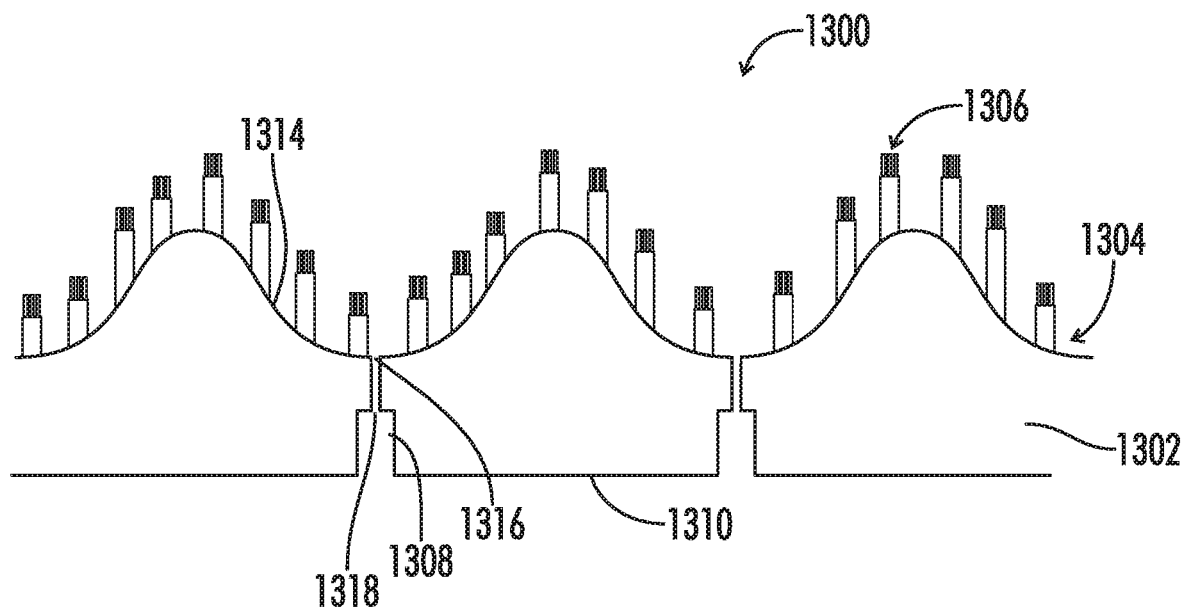
FIG. 13 is a cross-sectional view of an adhesive device comprising three microstructured patterns and capillaries.

Referring now to FIG. 13, an embodiment of the present invention may be a microstructured adhesive pressure-sensitive surface comprised of three microstructured patterns of different dimensions arranged hierarchically wherein at least one of the microstructured patterns is suctional or the hierarchical combinations creates a suctional aspect. The surface 1300 may consist of a flat substrate layer 1302 wherein on top of the substrate layer is embossed solid cylinders 1304. In some embodiments, the solid cylinders 1304 may be in a uniformly spaced square array. On top of each cylinder 1304 in the first pattern of cylinders may be embossed 1 to 10 solid cylinders of a smaller dimension 1306. The surface 1300 may also comprise interstitial areas between the first layer of cylinders 1304 wherein cylindrical holes 1308 may be disposed about the bottom portion 1310 of the substrate layer 1302. These cylindrical holes may not communicate with the upper surface 1314, but may stop between 5 and 20 microns before breaching the upper surface 1314. Piercings 1316 may be disposed about the substrate layer 1302 such that each piercing may be aligned (or contiguous with) along the center axis 1318 of the holes 1308. The piercing 1316 may have a diameter of between 1 to 10 microns. The fractal dimension of the cylindrical holes 1308 may be in the range of 0.25 to 0.70. The capillary effect may be initiated by placing the microstructure surface on the fluid layer of the target surface without any applied pressure. The first hierarchical cylinders may draw water away from the target surface sufficiently that the water comes into contact with the pierced surface of the substrate layer. Then a slight pressure may be applied to the substrate 1300 and the piercings 1316 act as valves to let fluid leave the interface layer through the cylindrical holes 1308, and not to return.

Thus, although there have been described particular embodiments of the present invention of a new and useful Patterned Surfaces with Suction it is not intended that such references be construed as limitations upon the scope of this invention except as set forth in the following claims.

What is claimed is:

1. A substrate having pressure-sensitive adhesion to a target surface, the substrate comprising:
   a surface with at least a first microstructure pattern, a second microstructure pattern, and a third microstructure pattern, the first microstructure pattern including a plurality of ridges, the second microstructure pattern comprising a plurality of micropillars, and the third microstructure pattern comprising a plurality of tiered columns;
   the surface having at least a portion wherein the first, second, and third microstructure patterns are arranged having the plurality of micropillars arranged in a plurality of rows, the plurality of ridges disposed between and intersecting the plurality of micropillars, and wherein the plurality of tiered columns are disposed adjacent the plurality of micropillars.

2. The substrate of claim 1 wherein the plurality of ridges of the first microstructure pattern comprises a first set of latitudinal ridges and second set of longitudinal ridges.

3. The substrate of claim 1 wherein at least one of the plurality of micropillars of the second microstructure pattern comprise at least two latitudinal through-holes,
   each of the at least two latitudinal through-holes having a latitudinal through-hole height, the latitudinal through-holes disposed about the at least one micropillar,
   at least two longitudinal through-holes, each of the at least two longitudinal through-holes having a longitudinal through-hole height, and
   the longitudinal through-hole heights not equaling the latitudinal through-hole heights.

4. The substrate of claim 1 wherein the plurality of micropillars further comprise a first set of micropillars and a second set of smaller micropillars wherein the first set of micropillars and second set of micropillars are arranged hierarchically such that the second set of micropillars is disposed on a top portion of the first set of micropillars.

5. The substrate of claim 1 wherein each of the plurality of micropillars is between 10 and 50 microns in diameter, between 10 and 150 microns in height, and has a pitch between 20 and 200 microns.

6. The substrate of claim 1 wherein each of the plurality of tiered columns is between 10 and 50 microns in diameter, between 10 and 150 microns in height, and has a pitch between 20 and 200 microns.

7. The substrate of claim 1 wherein the plurality of ridges has a thickness between 5 and 50 microns, a height between 2 and 150 microns, and a pitch between 5 and 50 microns.

8. The substrate of claim 2 wherein the plurality of ridges are configured to generate capillary action when in contact with liquid.

9. The substrate of claim 1 wherein at least a portion of the first microstructure pattern, the second microstructure pattern, or the third microstructure pattern generates a Wenzel-Cassie state when in contact with a liquid.

10. The substrate of claim 1 wherein at least a portion of the first microstructure pattern, the second microstructure pattern, or the third microstructure pattern generates a Cassie-Baxter state when in contact with a liquid.

11. The substrate of claim 1 wherein the surface is a top surface, the substrate further comprises a bottom surface and an interior between the top surface and the bottom surface; the interior having a plurality of holes, each hole of the plurality of holes being connected with at least one of the top layer, the bottom layer, or both.

12. The substrate of claim 11 wherein at least one hole of the plurality of holes has a circumferential surface that is hydrophilic.

13. The substrate of claim 11 wherein at least one hole of the plurality of holes has a circumferential surface that is hydrophobic.

14. The substrate of claim 3 wherein at least two latitudinal through-holes have a profile selected from the group consisting of circular, oval, rectangular, star, and polygonal.

15. The substrate of claim 2 wherein the latitudinal ridges comprise a plurality of individual ridges oriented on a first axis, the longitudinal ridges comprise a plurality of individual ridges oriented on a second axis, wherein the first axis is different from the second axis.

16. The substrate of claim 15 wherein the latitudinal ridges connect to the longitudinal ridges via the plurality of micropillars.

* * * * *